US008289296B2

(12) United States Patent
Jeong et al.

(10) Patent No.: US 8,289,296 B2
(45) Date of Patent: Oct. 16, 2012

(54) TOUCH SCREEN PANEL

(75) Inventors: Hwan-Hee Jeong, Suwon-si (KR);
Tae-Hyeog Jung, Suwon-si (KR);
Sung-Ku Kang, Suwon-si (KR);
Jung-Mok Park, Suwon-si (KR);
Choon-Hyop Lee, Suwon-si (KR);
Shawn Kim, Suwon-si (KR);
Sang-Kook Kim, Suwon-si (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 749 days.

(21) Appl. No.: 12/385,074

(22) Filed: Mar. 30, 2009

(65) Prior Publication Data
US 2010/0134436 A1  Jun. 3, 2010

(30) Foreign Application Priority Data
Dec. 1, 2008  (KR) .................. 10-2008-0120385

(51) Int. Cl.
*G06F 3/45*  (2006.01)
(52) U.S. Cl. .................................................... 345/174
(58) Field of Classification Search .............. 345/76, 345/82–87, 104, 107, 173–175, 204, 211; 178/18.01–18.03; 341/22; 382/115, 565; 313/495, 504; 349/1
See application file for complete search history.

(56) References Cited

U.S. PATENT DOCUMENTS

| | | | |
|---|---|---|---|
| 5,648,642 A | 7/1997 | Miller et al. | |
| 6,091,406 A * | 7/2000 | Kambara et al. | 345/177 |
| 6,879,096 B1 * | 4/2005 | Miyazaki et al. | 313/495 |
| 6,970,160 B2 * | 11/2005 | Mulligan et al. | 345/173 |
| 7,053,968 B2 | 5/2006 | Hong et al. | |
| 7,202,859 B1 | 4/2007 | Speck et al. | |
| 7,821,502 B2 * | 10/2010 | Hristov | 345/173 |
| 8,004,500 B2 * | 8/2011 | Elias | 345/174 |
| 2002/0093491 A1 * | 7/2002 | Gillespie et al. | 345/173 |
| 2004/0119701 A1 * | 6/2004 | Mulligan et al. | 345/173 |

(Continued)

FOREIGN PATENT DOCUMENTS

KR  10-2003-0085474  11/2003

(Continued)

OTHER PUBLICATIONS

Korean Office Action issued by the KIPO dated Sep. 29, 2010, together with a Request for Entry.

(Continued)

*Primary Examiner* — Prabodh M Dharia
(74) *Attorney, Agent, or Firm* — Robert E. Bushnell, Esq.

(57) ABSTRACT

A touch screen panel that includes a transparent substrate, first sensing patterns formed on the transparent substrate and having first sensing cells arranged in a column and first coupling lines for coupling adjacent first sensing cells, second sensing patterns formed on the transparent substrate and having second sensing cells arranged in a row of the same Y coordinate in a second direction. An insulating layer is formed on the first and second sensing patterns with a number of contact holes formed to expose end portions of the second sensing cells that form the second sensing patterns are formed. A number of coupling patterns are formed on the insulating layer where the contact holes were formed. A number of metal patterns are arranged on edges of regions in which the first and second sensing patterns are formed to electrically couple the sensing patterns in the units of the column or the row to position detection lines.

14 Claims, 3 Drawing Sheets

U.S. PATENT DOCUMENTS

| | | |
|---|---|---|
| 2004/0189587 A1 | 9/2004 | Jung et al. |
| 2006/0038793 A1 | 2/2006 | Philipp |
| 2006/0077153 A1* | 4/2006 | Cummings et al. ............. 345/85 |
| 2006/0181516 A1* | 8/2006 | Staines ......................... 345/173 |
| 2007/0008299 A1* | 1/2007 | Hristov ......................... 345/173 |
| 2007/0070047 A1 | 3/2007 | Jeon et al. |
| 2007/0160263 A1* | 7/2007 | Abiko et al. .................. 382/115 |
| 2007/0216657 A1 | 9/2007 | Konicek |
| 2008/0048997 A1* | 2/2008 | Gillespie et al. ............. 345/174 |
| 2008/0122661 A1* | 5/2008 | Han ................................ 341/22 |
| 2008/0158198 A1* | 7/2008 | Elias ............................. 345/174 |
| 2008/0165158 A1* | 7/2008 | Hotelling et al. ............. 345/174 |
| 2008/0264699 A1* | 10/2008 | Chang et al. ................ 178/18.01 |
| 2009/0087087 A1* | 4/2009 | Palum et al. ................. 382/165 |
| 2009/0109190 A1* | 4/2009 | Elias ............................. 345/174 |
| 2009/0219258 A1* | 9/2009 | Geaghan et al. ............. 345/173 |
| 2009/0231497 A1* | 9/2009 | Takahashi et al. ................ 349/1 |
| 2009/0277695 A1* | 11/2009 | Liu et al. ..................... 178/18.03 |
| 2011/0018841 A1* | 1/2011 | Hristov ......................... 345/174 |

FOREIGN PATENT DOCUMENTS

| | | |
|---|---|---|
| KR | 10-2004-0043903 | 5/2004 |
| KR | 100681157 | 2/2007 |
| KR | 1020080049248 A | 6/2008 |
| KR | 1020080096976 A | 11/2008 |

OTHER PUBLICATIONS

Korean Office action issued on Sep. 28, 2011 by Korean Patent Office, corresponding to Korean Patent Application No. 10-2008-0120385. together with "Request for Entry".

* cited by examiner

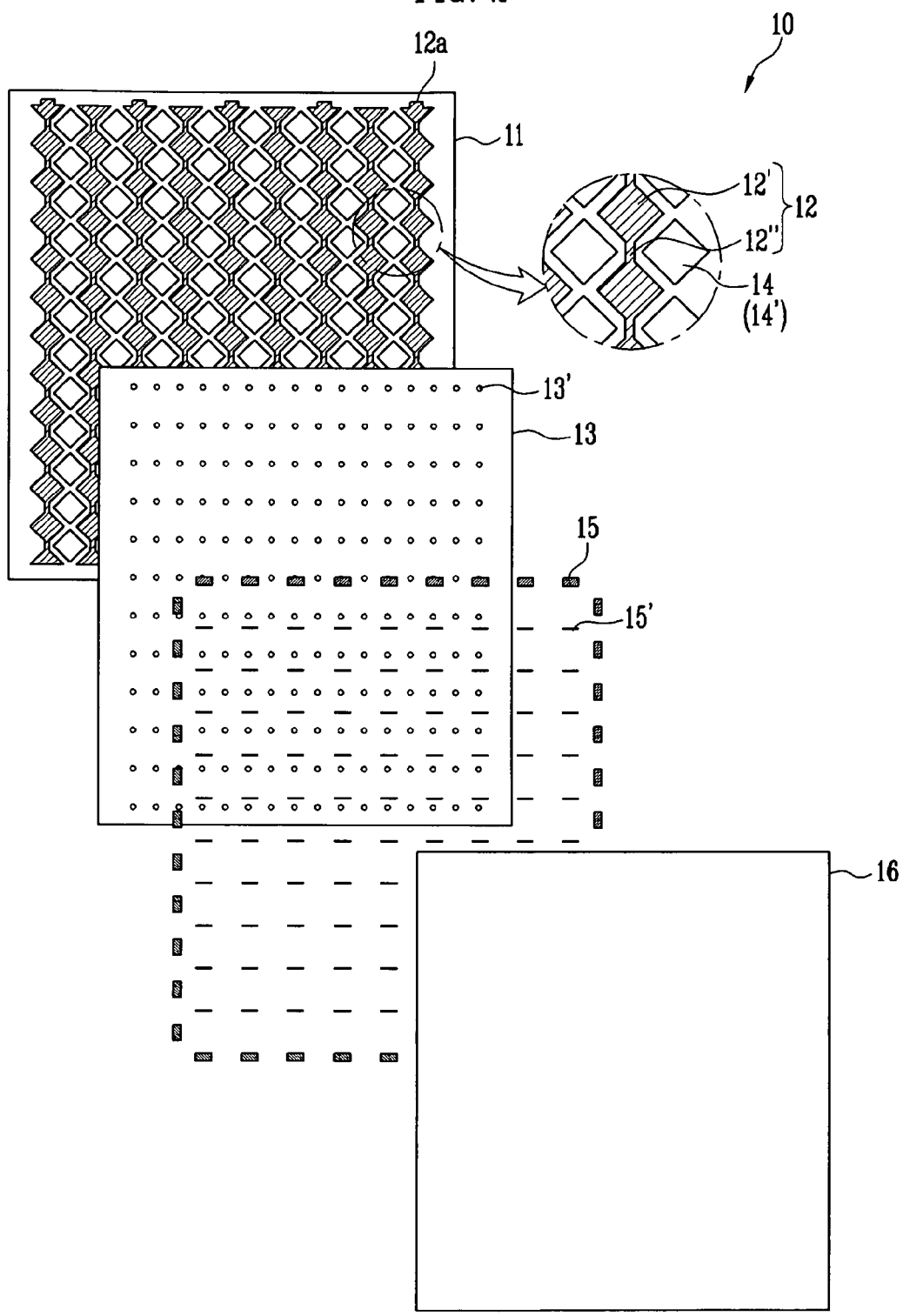

TOUCH SCREEN PANEL

CLAIM OF PRIORITY

This application makes reference to, incorporates the same herein, and claims all benefits accruing under 35 U.S.C. §119 from an application earlier filed in the Korean Intellectual Property Office on Dec. 1, 2008 and there duly assigned Serial. No. 10-2008-0120385.

BACKGROUND OF THE INVENTION

1. Field of the Invention

The present invention relates to a touch screen panel, and more particularly, to a touch screen panel capable of minimizing the resistance of the intersections of first sensing patterns and second sensing patterns formed on the same layer that intersect with each other.

2. Description of the Related Art

A touch screen panel is an input device capable of inputting user's instruction by selecting an instruction displayed on the screen of an image display device by ones' finger or an object.

Therefore, the touch screen panel is provided on the front face of the image display device to convert the contact position where the one's finger or the object is directly contacted into an electrical signal. Therefore, the instruction selected in the contact position is received as an input signal. Since the touch screen panel can replace an additional input device coupled to the image display device to operate such as a keyboard and a mouse, the usage of the touch screen panel is gradually increasing.

The above information disclosed in this Related Art section is only for enhancement of understanding of the background of the invention and therefore it may contain information that does not form the prior art that is already known to a person of ordinary skill in the art.

SUMMARY OF THE INVENTION

Accordingly, it is an object of the present invention to provide a touch screen panel in which coupling patterns for coupling first sensing patterns and second sensing patterns formed on the same layer to each other is formed of the same material as the metal pattern formed on the outline of the touch screen panel so that a mask process of forming the additional coupling patterns is removed and that the resistance of the intersections of the first sensing patterns and the second sensing patterns is reduced to prevent sensitivity from deteriorating.

In order to achieve the foregoing and/or other objects of the present invention, according to an embodiment of the present invention, there is provided a touch screen panel including a transparent substrate, first sensing patterns formed on the transparent substrate and having first sensing cells arranged in a column of the same X coordinate in a first direction and first coupling lines for coupling adjacent first sensing cells, second sensing patterns formed on the transparent substrate and having second sensing cells arranged in a row of the same Y coordinate in a second direction, an insulating layer formed on the first and second sensing patterns and having a plurality of contact holes formed to expose end portions of the second sensing cells that form the second sensing patterns are formed, a plurality of coupling patterns formed on the insulating layer where the contact holes are formed to electrically couple the second sensing cells to each other, and a plurality of metal patterns arranged on edges of regions in which the first and second sensing patterns are formed to electrically couple the sensing patterns in the units of the column or the row to position detection lines.

The plurality of coupling patterns and the metal patterns are formed in the same layer and are formed of a material having a smaller resistance value than a material of which the first and second sensing patterns are formed.

The first and second sensing patterns are formed of a transparent electrode material having a thickness of 100 to 300 Å. The transparent electrode material is indium tin oxide (ITO).

End portions of the coupling patterns are formed to be wider than other portions of the coupling patterns. The end portions of the coupling patterns are in contact with the contact holes of the insulating layer.

According to the present invention, the coupling patterns for coupling the first sensing patterns and the second sensing patterns formed on the same layer are formed of the same material as the metal patterns formed on the outline of the touch screen panel. Therefore, the mask process of forming the additional coupling patterns is removed so that the resistance of the intersections is reduced and that sensitivity is prevented from deteriorating.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 is an exploded plan view of a touch screen panel according to an embodiment of the present invention.

DETAILED DESCRIPTION OF THE INVENTION

Figure 1A:
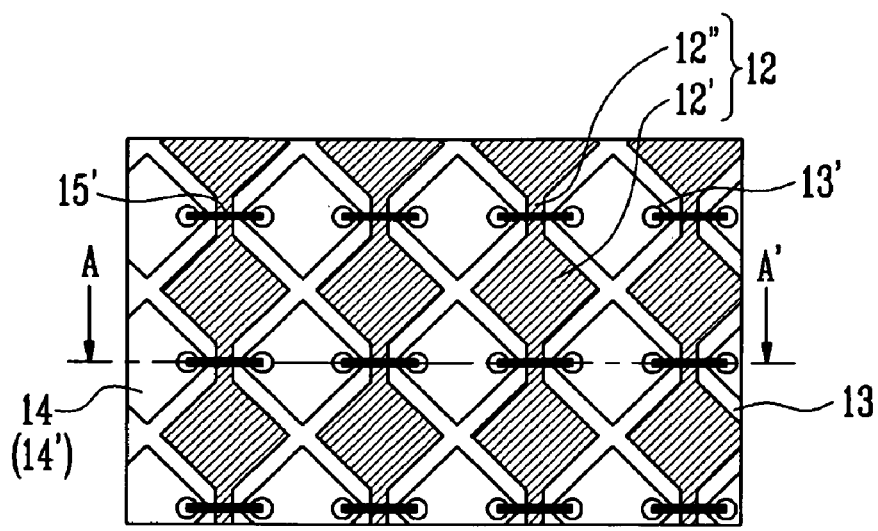
FIG. 1A is a plan view illustrating the arrangement of sensing patterns according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "coupled to" another element, it can be directly coupled to another element or be indirectly coupled to another element with one or more intervening elements interposed therebetween.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the principles for the present invention.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Several methods of realizing or creating a touch screen panel are possible including a resistive layer method, a photosensing method, and an electrostatic capacity method.

Among the above methods, the touch screen panel of the electrostatic capacity method senses a change in the electrostatic capacity that a conductive sensing pattern forms together with another sensing pattern or a ground electrode when the human hand or the object contacts the touch screen panel to convert the contact position into the electrical signal.

Here, in order to clearly determine the contact position on the contact surface, the sensing pattern includes first sensing patterns (X patterns) formed to be coupled in a first direction and second sensing patterns (Y patterns) formed to be coupled in a second direction.

The first and second sensing patterns are commonly positioned in the same layer. In this case, the sensing patterns arranged on the same X or Y lines are coupled to each other by forming additional coupling patterns through the contact holes formed in the insulating layer formed on the sensing patterns.

Here, the coupling patterns are formed of a transparent conductive material such as the first and second sensing patterns. Therefore, since a mask process is to be added in order to form the coupling patterns, the number of masks increases and the mask process becomes more complicated.

In addition, the first or second sensing patterns are electrically coupled to each other through the additional coupling patterns. In this case, the first sensing patterns and the second sensing patterns intersect each other in regions where the coupling patterns are formed.

At this time, the width of the coupling patterns is minimized in order to reduce the influence of the parasitic capacitance generated by the coupling patterns. When the width of the coupling patterns is small, line resistance increases to the contrary so that sensitivity deteriorates.

In particular, since the resistance value of the transparent conductive material that realizes the first and second sensing patterns and the coupling patterns is large, the increase in the line resistance that is generated when the width of the coupling lines is reduced significantly affects the reduction in the sensitivity.

Embodiments of the present invention will be described in detail with reference to the accompanying drawings.

Figure 1B:
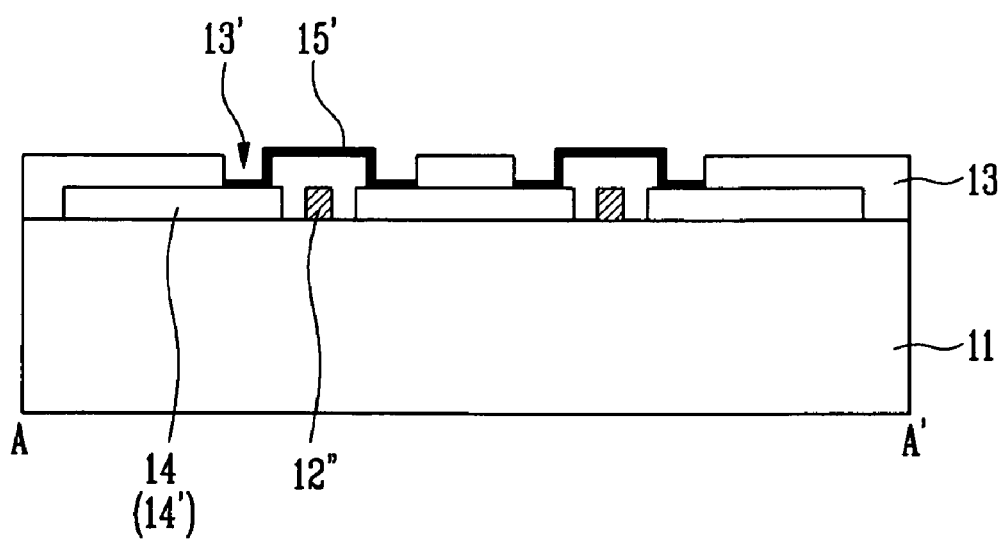
FIG. 1B is a cross-sectional view taken along line A-A' of FIG. 1A.

FIG. 1A is a plan view illustrating the arrangement of sensing patterns according to an embodiment of the present invention. FIG. 1B is a cross-sectional view taken along line A-A' of FIG. 1A.

Referring to FIGS. 1A and 1B, the sensing patterns according to an embodiment of the present invention include first and second sensing patterns 12 and 14 arranged to alternate with each other and formed to be coupled to each other in units of a column of the same X coordinate or a row of the same Y coordinates.

That is, the first sensing patterns 12 consist of first sensing cells 12' arranged in a column of the same X coordinate in a first direction (a column direction) and first coupling lines 12" for coupling the adjacent first sensing cells 12' to each other. The second sensing patterns 14 consist of second sensing cells 14' arranged in a row of the same Y coordinate in a second direction (a row direction).

At this time, according to an embodiment of the present invention, the first sensing patterns 12 and the second sensing patterns 14 are formed on the same layer formed on a substrate 11 and an insulating layer 13 is formed on the first and second sensing patterns 12 and 14.

In addition, the substrate 11 and the first and second sensing patterns 12 and 14 are to be formed of a transparent material in order to realize the operation of the touch screen panel. Therefore, the first and second sensing patterns 12 and 14 are preferably formed of indium tin oxide (ITO).

In order for the first sensing patterns 12 and the second sensing patterns 14 to operate as sensing electrodes, the sensing cells arranged in the first and second directions are to be electrically coupled to each other.

Therefore, the first sensing cells 12' are electrically coupled to each other by the first coupling lines 12". However, since the second sensing cells 14' that constitute the second sensing patterns are formed on the same layer as the first sensing cells 12', in order to prevent the second sensing cells 14' and the first coupling lines 12" from being short-circuited, coupling lines that intersect the first coupling lines 12" cannot be formed.

Therefore, according to an embodiment of the present invention, contact holes 13' are formed in the specific parts of the insulating layer 13 formed on the first and second sensing patterns 12 and 14, that is, as illustrated in FIG. 1B, in the corresponding regions at the left and right end portions of the second sensing cells 14' and coupling patterns 15' for electrically coupling the adjacent second sensing cells 14' to each other are formed on the insulating layer 13 wherein the contact holes 13' are formed.

In this case, the coupling patterns 15' for coupling the first coupling lines 12" of the first sensing patterns 12 to the second sensing cells 14' intersect each other. In order to reduce the influence of the parasitic capacitance generated by the intersections, the width of the coupling patterns 15' is preferably minimized.

However, as described above, when the width of the coupling patterns 15' is minimized, the line resistance of the second sensing patterns 14 increases so that sensitivity that realizes the function of the touch screen panel deteriorates.

Therefore, according to an embodiment of the present invention, in order to solve such a problem, the coupling patterns 15' are not formed of a transparent conductive material having a large resistance value, that is, ITO but are formed of a conductive material having a small resistance value.

That is, the coupling patterns 15' are formed at the edges of regions in which the first sensing patterns 12 and the second sensing patterns 14 are formed and are formed of the same material as a metal pattern (not shown) for supplying a sensed signal to a driving circuit (not shown). Since the coupling patterns 15' are formed on the same layer as the metal pattern and through the same process as the metal pattern, an additional mask process is not required to form the coupling patterns 15'.

Therefore, in the touch screen panel according to the present invention, since the coupling patterns 15' are not formed of the transparent conductive material such as the first and second sensing patterns 12 and 14, it is possible to prevent the line resistance from increasing and it is not necessary to add the mask process in order to form the coupling patterns 15'.

FIG. 2 is an exploded plan view of a touch screen panel according to an embodiment of the present invention.

Referring to FIG. 2, a touch screen panel 10 according to an embodiment of the present invention includes a transparent substrate 11, first and second sensing patterns 12 and 14 formed on the transparent substrate 11, a first insulating layer 13 formed on the first and second sensing patterns 12 and 14 and having a plurality of contact holes 13' to expose the end portions of the second sensing cells 14' that form the second sensing patterns are formed, coupling patterns 15' formed on the first insulting layer 13 in which the contact holes 13' are formed to electrically couple the adjacent second sensing cells 14' to each other, and a plurality of metal patterns 15 arranged on the edges of regions in which the first and second sensing patterns 12 and 14 are formed to electrically couple the sensing patterns 12 and 14 in units of a column or a row to position detecting lines (not shown).

The first sensing patterns 12 are formed on one surface of the transparent substrate 11 to be coupled to each other in a first direction. For example, the first sensing patterns 12 can be formed on the upper surface of the transparent substrate 11 to be close to first sensing cells 12' having a regular pattern such as a diamond pattern.

That is, the first sensing patterns 12 consist of the first sensing cells 12' arranged in a column of the same X coordinate in a first direction (a column direction) and first coupling lines 12" for coupling adjacent first sensing cells 12'. Here, the shape of the first sensing cells 12' is not limited to a diamond shape but can be various so that the first sensing cells 12' can be close to each other.

The first sensing patterns 12 include pads 12a to be electrically coupled to the metal patterns 15 in units of columns. The pads 12a of the first sensing patterns 12 are alternately provided in upper and lower parts in units of columns or can be provided in both of upper and lower parts.

In addition, the second sensing patterns 14 are formed on the transparent substrate 11 where the first sensing patterns 12 are formed in a second direction and are arranged to alternate with the first sensing patterns 12 so as not to overlap with the first sensing patterns 12.

That is, the second sensing patterns 14 consist of second sensing cells 14' arranged in a column of the same Y coordinate in the second direction (a row direction). The second sensing cells 14' are formed to close to the first sensing cells 12' in the same diamond pattern as the first sensing cells 12'.

The second sensing patterns 14 include pads (not shown) to be electrically coupled to the metal patterns 15 in units of a row. The pads of the second sensing patterns 14 can be alternately provided on the left and right sides in units of a row or can be provided on both left and right sides.

At this time, the first sensing cells 12' are not formed in regions that overlap the second sensing cells 14'. That is, the first sensing cells 12' and the second sensing cells 14' are arranged to alternate with each other.

In addition, the first insulating layer 13 is formed on the first and second sensing patterns 12 and 14 to cover the first and second sensing patterns 12 and 14. The metal patterns 15 are arranged on the edges of regions in which the first and second sensing patterns 12 and 14 are formed, in particular, in regions corresponding to the pads of the first and second sensing patterns 12 and 14. The metal patterns 15 electrically couple the sensing patterns 12 and 14 in units of a column or a row to position detection lines (not shown) so that a contact position detection signal is supplied to a driving circuit that is not shown.

Meanwhile, the first and second sensing patterns 12 and 14 and the first insulating layer 13 are formed of a transparent material so that light emitted from a display panel (not shown) provided under the touch screen panel 10 can pass through the touch screen panel 10. That is, the first and second sensing patterns 12 and 14 are formed of a transparent electrode material such as ITO and the first insulating layer 13 is formed of a transparent insulating material.

The first and second sensing patterns 12 and 14 and the first insulating layer 13 may have a thickness set in a range where transmittance with which light from the display panel is transmitted is secured and where the touch screen panel 10 (in particular, the first and second sensing patterns 12 and 14) can have relatively low surface resistance. That is, the thicknesses of the first and second sensing patterns 12 and 14 and the first insulating layer 13 can be set to be optimized in consideration of the transmittance and the surface resistance.

For example, the first and second sensing patterns 12 and 14 can be formed of ITO patterns having a thickness of 100 to 300 Å and the first insulating layer 13 can be formed of a transparent insulating material having a thickness of 400 to 1,000 Å (in particular, 400 to 700 Å) in which photorefractivity of 1.6 to 1.9 is secured. The above is only an embodiment and the present invention is not limited to the above. The thicknesses of the first and second sensing patterns 12 and 14 and the first insulating layer 13 can be changed in consideration of the transmittance and/or the surface resistance.

In addition, in order for the first sensing patterns 12 and the second sensing patterns 14 to operate as sensing electrodes, the sensing cells arranged in the first direction and the second direction are to be electrically coupled to each other.

Therefore, the first sensing cells 12' are electrically coupled to each other by the first coupling lines 12". However, since the second sensing cells 14' that constitute the second sensing patterns are formed in the same layer as the first sensing cells 12', in order to prevent the second sensing cells 14' and the first coupling lines 12" from being short circuited, coupling lines that intersect the first coupling lines 12" cannot be formed.

Therefore, according to an embodiment of the present invention, contact holes 13' are formed in the specific parts of the insulating layer 13 formed on the first and second sensing patterns 12 and 14, that is, as illustrated in FIG. 1B, in the corresponding regions at the left and right end portions of the second sensing cells 14' and coupling patterns 15' for electrically coupling the adjacent second sensing cells 14' to each other are formed on the insulating layer 13 wherein the contact holes 13' are formed.

In this case, the coupling patterns 15' for coupling the first coupling lines 12" of the first sensing patterns 12 to the second sensing cells 14' intersect each other. According to the present invention, in order to prevent the line resistance of the second sensing patterns 14 from increasing while reducing the influence of the parasitic capacitance generated by the intersection, the coupling patterns 15' are formed of the same material as the metal patterns 15 formed of a small resistance value. In this case, since the coupling patterns 15' are formed in the same layer and through the same processes as the metal patterns 15, an additional mask process is not required for forming the coupling patterns 15'.

Therefore, since the coupling patterns 15' are not formed of the transparent conductive material as the first and second sensing patterns 12 and 14, it is possible to prevent the line resistance from increasing and it is not necessary to add the mask process in order to form the coupling patterns 15'.

In addition, a second insulating layer 16 is formed on the metal patterns 15 and the coupling patterns 15' to cover the metal patterns 15 and the coupling patterns 15'. For example, the second insulating layer 16 can be formed on the metal patterns 15 and the coupling patterns 15' of a transparent insulating material having a thickness of 400 to 1,000 Å. The second insulating layer 16 can be omitted in accordance with the design of a product.

In the above-described touch screen panel 10, when a human hand or an object contacts the touch screen panel 10, a change in electrostatic capacity in accordance with a contact position is transmitted to a driving circuit via the first and second sensing patterns 12 and 14, the metal patterns 15, and a position detection line. The change in the electrostatic capacity is converted into an electrical signal by an X and Y input processing circuit (not shown) so that the contact position is grasped.

Meanwhile, a transparent ground electrode (not shown) and a third insulating layer (not shown) for covering the transparent ground electrode can be further formed on the other surface opposite to one surface of the transparent substrate 11 on which the first and second sensing patterns 12 and 14 are formed, for example, on the lower surface of the transparent substrate 11.

For example, the transparent ground electrode formed of the transparent electrode material such as ITO having a thickness of 100 to 300 Å can be formed on the lower surface of the transparent substrate 11 and the third insulating layer having a thickness of 400 to 1,000 Å for covering the transparent ground electrode can be formed under the transparent ground electrode.

However, the above is only an embodiment. The thicknesses of the transparent ground electrode and the third insulating layer can vary in consideration of light transmittance. In addition, the transparent ground electrode and/or the third insulating layer can be omitted in accordance with the design of a product.

The transparent ground electrode can be used for securing stability between the touch screen panel 10 and the display panel and can be used for forming electrostatic capacity together with the first and second sensing patterns 12 and 14 in accordance with a method of designing the touch screen panel 10.

That is, in the touch screen panel 10 of electrostatic capacity, in order to sense the contact position, electrostatic capacity between the first sensing patterns 12 and the second sensing patterns 14 or electrostatic capacity between the first and second sensing patterns 12 and 14 and the transparent ground electrode can be used, which can vary.

Figure 3:
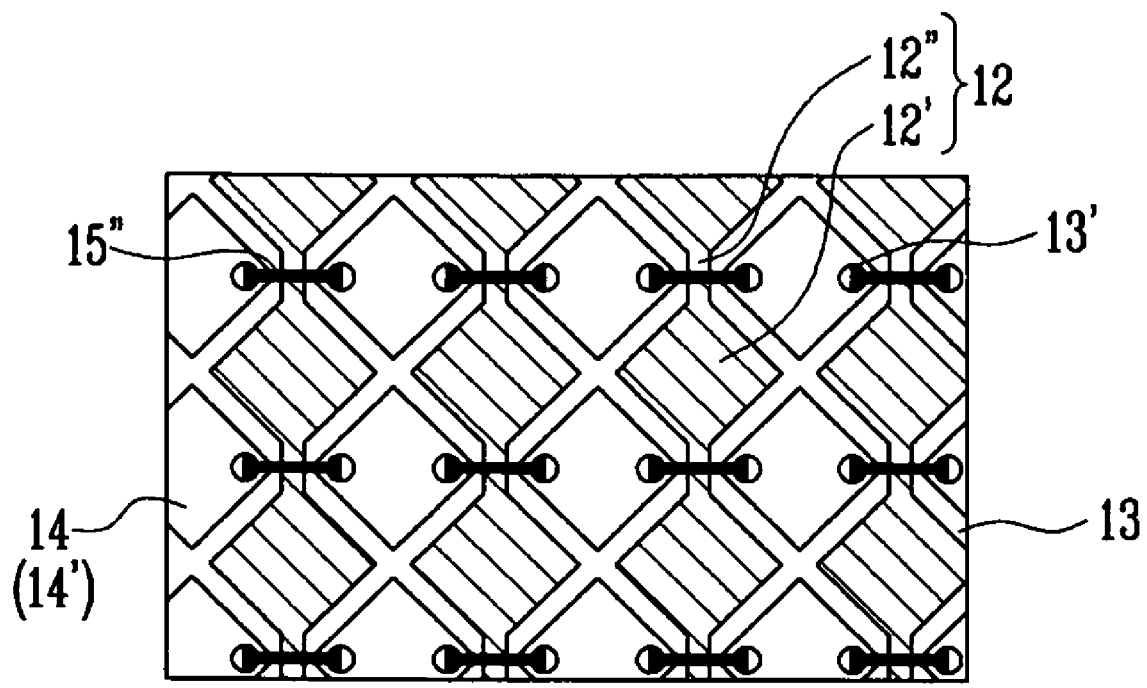
FIG. 3 is a plan view illustrating the arrangement of sensing patterns according to another embodiment of the present invention.

FIG. 3 is a plan view illustrating the arrangement of sensing patterns according to another embodiment of the present invention.

The above corresponds to the embodiment of the present invention illustrated in FIG. 1A. The same reference numerals are used for the same components as the components illustrated in FIG. 1A excluding the coupling patterns 15" and detailed description thereof will be omitted.

Referring to FIG. 3, when the present embodiment is compared with the embodiment illustrated in FIG. 1, the shape of the coupling patterns 15" according to the present embodiment is different from the shape of the coupling patterns 15" according to the embodiment illustrated in FIG. 1. In the case of the embodiment illustrated in FIG. 3, the coupling patterns 15" are characterized in that the width of the parts that contact the contact holes 13' of the insulating layer 13, that is, the end portions of the coupling patterns is larger than the width of the other parts of the coupling patterns.

According to another embodiment of the present invention, the coupling patterns 15' and 15" are formed of a material having low resistance in order to reduce the line resistance of the second sensing patterns 14. However, in this case, since the coupling patterns 15' and 15" are formed of an opaque metal, in order for the coupling patterns 15' and 15" to operate as the touch screen panel, the coupling patterns 15' and 15" are to be maximally reduced. That is, the width of the coupling patterns is preferably formed to be maximally small.

However, in the case where the width of the coupling patterns is formed to be small, when the coupling patterns are formed by the exterior angle step differences of the contact holes 13' formed in the insulating layer 13, that is, when etching is performed, due to the large etching rate in the step differences, as the width of the coupling patterns is smaller, a probability of breaking the coupling patterns increases.

In order to solve the problem, in the embodiment illustrated in FIG. 3, the portions of the coupling patterns 15" that contact the contact holes 13', i.e., the end portions of the coupling patterns 15", are formed to be wider than the other parts of the coupling patterns 15" so that it is possible to prevent the coupling patterns 15" from being broken by the step differences of the contact holes 13'.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel, comprising:
a transparent substrate;
first sensing patterns formed on the transparent substrate and comprising first sensing cells arranged in a column of the same X coordinate in a first direction and first coupling lines for coupling adjacent first sensing cells;
second sensing patterns formed on the transparent substrate and comprising second sensing cells arranged in a row of the same Y coordinate in a second direction;
an insulating layer formed on the first and second sensing patterns and having a plurality of contact holes formed to expose end portions of the second sensing cells that form the second sensing patterns are formed;
a plurality of coupling patterns formed on the insulating layer where the contact holes are formed to electrically couple the second sensing cells to each other; and
a plurality of metal patterns arranged on edges of regions in which the first and second sensing patterns are formed to electrically couple the sensing patterns in the unit of the column or the row to position detection lines,
wherein the second sensing patterns are made of a different material than the plurality of coupling patterns, and
wherein the plurality of coupling patterns and the metal patterns are formed in the same layer and are formed of a material having a smaller resistance value than a material of which the first and second sensing patterns are formed.

2. The touch screen panel as claimed in claim 1, wherein the second sensing cells are arranged to alternate with the first sensing cells so as not to overlap with the first sensing cells.

3. The touch screen panel as claimed in claim 1, wherein the first and second sensing patterns are formed of a transparent electrode material having a thickness of 100 to 300 Å.

4. The touch screen panel as claimed in claim 3, wherein the transparent electrode material is indium tin oxide (ITO).

5. The touch screen panel as claimed in claim 1, wherein end portions of the coupling patterns are formed to be wider than other portions of the coupling patterns.

6. The touch screen panel as claimed in claim 5, wherein the end portions of the coupling patterns are in contact with the contact holes of the insulating layer.

7. The touch screen panel as claimed in claim 1, wherein the end portions of the coupling patterns are in contact with the contact holes of the insulating layer.

8. The touch screen panel as claimed in claim 1, wherein the plurality of coupling patterns are made of an opaque metal.

9. A touch screen panel, comprising:
a transparent substrate;
first sensing patterns formed on the transparent substrate and comprising first sensing cells arranged in a column of the same X coordinate in a first direction and first coupling lines for coupling adjacent first sensing cells;
second sensing patterns formed on the transparent substrate and comprising second sensing cells arranged in a row of the same Y coordinate in a second direction;
an insulating layer formed on the first and second sensing patterns and having a plurality of contact holes formed to expose end portions of the second sensing cells that form the second sensing patterns are formed;
a plurality of coupling patterns composed of a low resistance conductive material formed on the insulating layer where the contact holes are formed to electrically couple the second sensing cells to each other, each of said plurality of coupling patterns having two ends portions; and
a plurality of metal patterns composed of the same low resistance conductive material as the plurality of coupling patterns and arranged on edges of regions in which the first and second sensing patterns are formed to electrically couple the sensing patterns in the unit of the column or the row to position detection lines,
wherein the second sensing patterns are made of a different material than the plurality of coupling patterns and said two end portions of each of the plurality of coupling patterns are wider than any other portion of each of the plurality of coupling patterns.

10. The touch screen panel as claimed in claim 9, wherein the plurality of coupling patterns and the metal patterns are formed in the same layer and are formed of a material having a smaller resistance value than a material of which the first and second sensing patterns are formed.

11. The touch screen panel as claimed in claim 9, wherein the second sensing cells are arranged to alternate with the first sensing cells so as not to overlap with the first sensing cells.

12. The touch screen panel as claimed in claim 9, wherein the first and second sensing patterns are formed of a transparent electrode material having a thickness of 100 to 300 Å.

13. The touch screen panel as claimed in claim 12, wherein the transparent electrode material is indium tin oxide (ITO).

14. The touch screen panel as claimed in claim 9, wherein the plurality of coupling patterns are made of an opaque metal.

* * * * *